June 30, 1931.   M. P. E. HOHN   1,812,294
MEANS FOR DRESSING CIGARETTES AND THE LIKE PROVIDED WITH IMPRINTS
Filed Aug. 30, 1928    6 Sheets-Sheet 1

Inventor
Max Paul Ernst Hohn
Max D. Ordmann
Attorney

June 30, 1931.   M. P. E. HOHN   1,812,294
MEANS FOR DRESSING CIGARETTES AND THE LIKE PROVIDED WITH IMPRINTS
Filed Aug. 30, 1928   6 Sheets-Sheet 2

Inventor
Max Paul Ernst Hohn

Max D. Ordmann
Attorney

June 30, 1931. M. P. E. HOHN 1,812,294
MEANS FOR DRESSING CIGARETTES AND THE LIKE PROVIDED WITH IMPRINTS
Filed Aug. 30, 1928 6 Sheets-Sheet 6

Inventor
Max Paul Ernst Hohn
Max J. Ordmann
Attorney

Patented June 30, 1931

1,812,294

UNITED STATES PATENT OFFICE

MAX PAUL ERNST HOHN, OF DRESDEN, GERMANY, ASSIGNOR TO THE FIRM "UNIVERSELLE" CIGARETTENMASCHINENFABRIK J. C. MULLER & CO., OF DRESDEN, GERMANY

MEANS FOR DRESSING CIGARETTES AND THE LIKE PROVIDED WITH IMPRINTS

Application filed August 30, 1928, Serial No. 302,984, and in Germany September 5, 1927.

Figure 1:
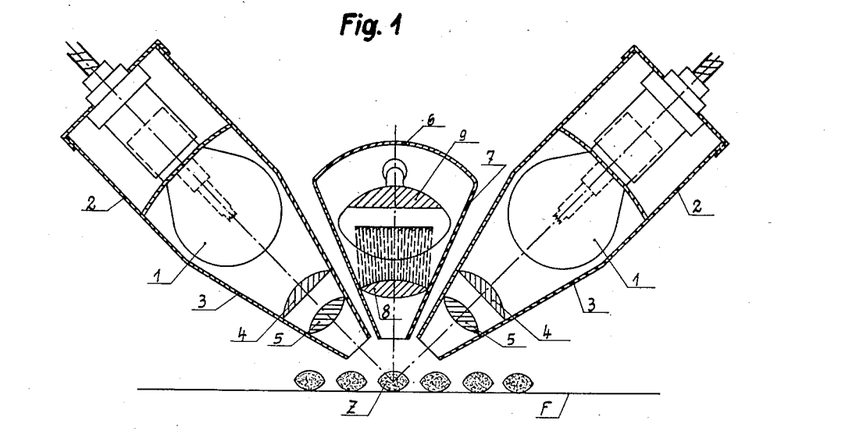
Figs. 1 and 2 are vertical transverse sections of two arrangements of the light-sensitive medium.

In machines such as cigarette making machines which deliver work provided with printed matter, it is desirable that the work which is delivered and which is to be packed in containers, e. g. cigarette boxes, should all be disposed as regards the imprints in the same direction. This is necessary because in the packets all the articles i. e. cigarettes must lie so that the side containing the impression is turned towards the observer.
It is of course possible as the articles come from the machine to see whether they lie with the imprint in the correct position but it is troublesome and takes time to turn into the correct position every article which is reversed.
New media strongly sensitive to light or heat (so-called selenium cells, photo cells or karalus cells) are well-known which react in an extraordinarily sensitive manner to light rays directed thereon and supply or alter an electric current dependent on the intensity of the illumination. If light rays are directed on the part of the articles provided with imprints these rays are reflected from such parts. If the reflected rays are directed towards the light- or heat-sensitive medium, then the intensity of the reflected rays differs according as the part from which the rays are reflected is provided with an imprint or not. In this manner the differences in intensity of the reflected rays can be converted by the heat- or light-sensitive medium in known manner into electrical energy which through the interposition of suitable strengthening relays may control mechanical means for turning the articles with their imprints reversed into their correct positions.
If the articles are of cylindrical or oval section as for example cigarettes, then the parts provided with the imprint are more or less curved. This curvature presents difficulties for directing substantially all the reflected rays to the heat- or light-sensitive media.
These difficulties are overcome by projecting parallel light rays from one or more strong sources of light on these portions of the cigarette in such manner that the diverging reflected rays due to the curved cigarette surface are approximately completely caught by one or more collecting lenses condensers which directs them parallel to the heat- or light-sensitive medium.
If the sources of light are so arranged that the light-sensitive medium is located between them or the light-sensitive media are disposed on both sides of the source of light (the two media being connected with one another by compensating means) then a sufficient part of the main body of the reflected rays is supplied to the light-sensitive medium because in the one case the inclined bundle of light rays passing into the space between them are reflected while in the other case the central bundle of rays is reflected towards both sides.
In order that the invention may be fully understood reference is had to the accompanying diagrammatic drawings, in which
Figs. 5 to 9 illustrate a further construction, Fig. 5 being a side elevation in part vertical cross section.
Referring to Fig. 1, two high candle-power projectors 1 are provided each mounted in a casing 2. Each casing has a conical tapering portion 3 with an open end. Adjacent the conical tapering portions are provided the lenses 4 and 5 converting the rays from the lamp into parallel rays.

The casings are arranged with their longitudinal axes inclined in relation to one another in such manner that they subtend approximately a right angle, the apex being located in one of the cigarettes Z which are fed on the feed band F beneath the open ends of the tapering portion 3.

Between the two lamp casings is provided another casing 6, the central axis of which is vertical. In this casing is mounted a photo cell which delivers a current dependent on the intensity of the illumination. The casing 6 has a conical tapering portion 7 in which is mounted a lens 8 which converts the rays entering the casing into parallel rays directed on the cell 9. The opening for the light rays entering the cone 7 is disposed between the two outlets from which the parallel bundles of rays pass from the lamp casings and is located vertically over the cigarette Z being tested.

The parallel bundles of rays strike the curved surface of the cigarette and are thereby mainly so reflected that the reflected rays pass through the opening in the cone 7 to the lens 8.

Figure 2:
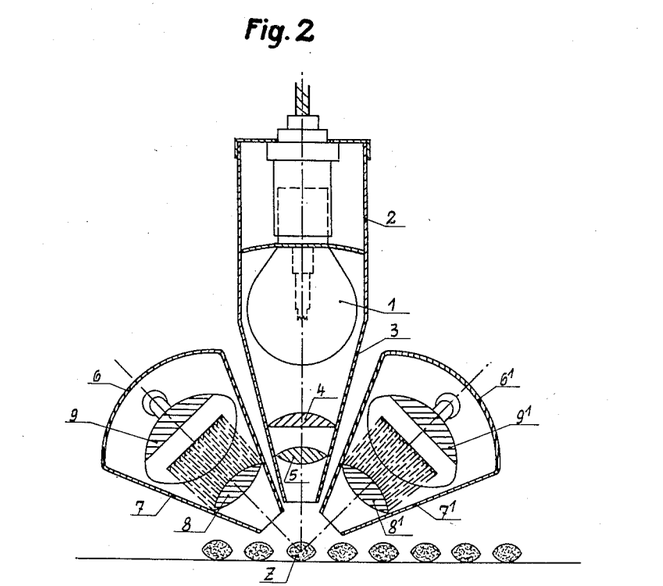

In the embodiment shown in Fig. 2 the high candle-power lamp 1 which is provided is mounted as before in a casing 2 having a conical portion 3. The lenses 4 and 5 are mounted as before to transform the rays from the lamp into parallel rays. In this instance however the longitudinal axis of the casing is at right angles to the path of movement of the cigarettes so that the parallel rays fall exactly from above on the curved portion of the cigarette Z. The reflected rays are now mainly directed laterally at an inclination. In order to intercept these rays there are provided two light-sensitive cells 9 and 9' in casings 6 and 6' provided with collecting members 7 and 7' with lenses 8 and 8'. The longitudinal axes of these casings are inclined in relation to one another so that they subtend substantially a right angle, the apex of which lies in the cigarettes Z.

By means of the arrangement described it is possible to illuminate the part of the cigarette where the imprint should be on its way past the light and the light-sensitive medium in spite of the curvature of the cigarette so that sufficiently strongly reflected rays may be certain to strike the light-sensitive medium.

In order to effect the rotation of the articles lying on their flat sides, e. g. the cigarettes, into the correct position, generally rotation through 180° is necessary. In order to effect this rotation various constructions of rotating devices may be provided.

Figure 3:
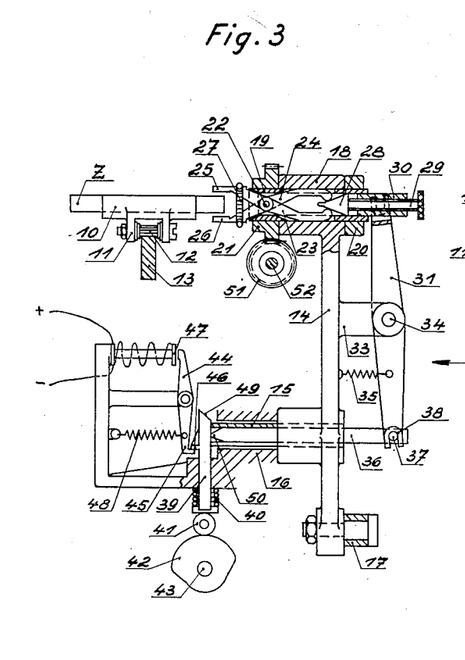
Figs. 3 and 4 illustrate means for turning cigarettes into the correct position, Fig. 3 being a side elevation seen in the direction of the arrow in Fig. 4, Fig. 4 being a front view partly in vertical cross section.
Figure 4:
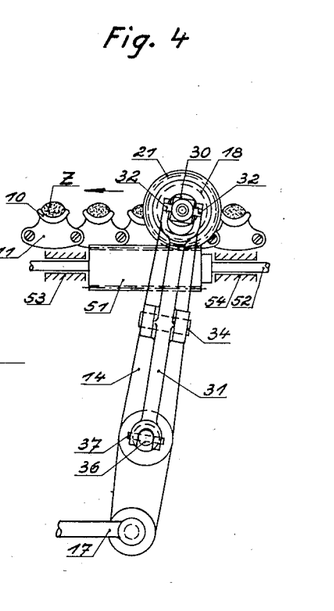

Referring to Figs. 3 and 4 the cigarettes Z which are shown as of oval cross section rest in correspondingly-shaped open seats 10 which are carried by chain links 11 which are guided by means of rollers 12 over a guide rail 13. The chain moves forward in the direction of the arrow shown in Fig. 4. The two ends of the cigarettes project right and left beyond the seat 10.

Parallel to the direction of movement of the chain is a rock lever 14 the hollow axis 15 of which is rotatable in the bearing 16 in the machine frame. To the lower free end of this rock lever is attached a connecting rod 17 which effects a continuous oscillating movement of the lever. The arrangement is such that the opening 18 located at the upper end of the lever 14 on the lever being swung in the direction of movement of the chain 10, 11, is moved with the same speed as the chain. In this opening projects a freely rotating member 19 which is formed as a sleeve. On this member is provided at one end a collar 20 and at the other end a worm wheel 21. On the rotating member is provided a cross pin 22 which extends diametrically through the sleeve and forms a pivot for the shanks 23 and 24 of a pair of grippers. Around the ends of the shanks 25 and 26 forming the jaws of the grippers projecting from the rotating member is coiled a spring 27 tending to close the jaws of the grippers. The other ends of the shanks extend into the rotating member.

Into the sleeve extends a cone 28 the screw-threaded spindle 29 of which projects into a bush 30 fitting within the sleeve. The bush with the cone can be displaced longitudinally in the sleeve without taking part in its rotation. In the position of the parts shown in Fig. 3, the cone is pushed so far forwards that it is extending into the path of the shanks of the grippers and forcing them apart to open the grippers. On the bush 30 is connected a lever 31, its forked end acting on lateral pins 32 on the bush. The lever 31 pivots at 34 on a bracket 33 on the rock lever 14. A spring 35 connected to the lever 31 which is formed as a double armed lever tends to turn the lever in a direction such as to move the cone 28 out of the path of the shanks 23 and 24 of the grippers. This tendency is opposed by a rod 36 which is movable longitudinally of the hollow axis 15 of the lever 14 and which carries a cross pin 37 the projecting ends of which engage recesses 38 in the free end of the lever 31.

The rod 36 is held in the position shown in Fig. 3 by a bolt 39 which is vertically movable in the part 16. This bolt is spring controlled by a spring 40 coiled around it which spring tends to press the bolt downwards. The bolt is fitted at its lower end with a roller 41 which may track a continuously rotating cam disc 42 on the shaft 43. The cam disc is so formed that one part extending over more than 180° serves to raise the bolt while the other reduced part permits the spring 40 to take control.

The bolt is however held in the raised position shown in Fig. 3 by a locking lever 44 the hooked-shaped end 45 of which engages beneath a lug 46 provided on the bolt. The other end of the locking lever is attracted by the armature 47 of an electromagnet which is energized by a circuit at the moment when the circuit is interrupted by the controlling means which are effective as soon as any cigarette fed past by means of the chain 10, 11, 12, assumes an incorrect position, as regards its imprint, the lever 44 being left to the influence of a spring 48 engaging it so that the hooked-shaped end 45 of the lug 46 is released. The arrangement is such that at this moment the cam disc 42 assumes the position in which it permits the bolt 39 to follow the influence of its spring 40 i. e. move downwards. When it does the bevelled face 49 of the bolt 39 comes into the path of the conical end of the rod 36 and this can be displaced to the left in Fig. 3. It will so move because the spring 35 tends to move the lever 31 in this direction. The cone 28 is thereby moved out of reach of the shanks 23 and 24 of the grippers and the grippers close. The grippers can thus seize the cigarette within reach.

These operations take place at the moment when the lever 14 is in the position shown in Fig. 4. The lever now begins to swing in the direction of movement of the chain.

The worm wheel mounted on the rotating member 19 engages with a worm 51 on the shaft 52 which is parallel to the direction of movement of the chain. The lever 14 is of such length in its outward swinging movement that engagement is maintained. The shaft 52 is held stationary in bearings 53 and 54. Accordingly on the outward swinging movement of the lever the worm wheel 21 is rotated. The diameter of the worm wheel is in such relation to the path traversed in the swinging movement of the lever that on the outward swinging movement of the lever the rotating member rotates through 90°. At the same time the speed of rotation of the worm 50 is such that it produces an additional rotation of the worm wheel 21 so that on the conclusion of the swinging movement of the lever 14 a total rotation of the rotating member 19 through 180° has occurred. If thus the jaws of the grippers have closed and gripped an oval cigarette such cigarette on the conclusion of the swinging movement of the lever 14 has been turned through 180°. In order that during this rotation the oval cigarette can be sufficiently raised from the seat 10 the central longitudinal axis of the rotating member 19 is disposed slightly above the central longitudinal axis of the cigarette in the seating so that the jaws 26 first raise the cigarette from the seating.

After the conclusion of the swinging movement of the lever 14 in the direction of feed of the chain the bolt 39 is raised by the cam disc 42, the rod 36 being moved to the right in Fig. 3 by the inclined face 49 in cooperation with the conical end 50. As a result the cone 28 is again moved into the path of the jaws 23 and 24 of the grippers and opens the grippers. The cigarette previously held is thus released.

The lever 14 with the jaws of the grippers open is swung back. The rotating member 19 does not rotate because in consequence of the relative dimensions of the worm wheel 21 and speed of rotation of the worm 51 the worm wheel 21 merely slides over the worm, the speed of swinging movement of the lever 14 being naturally suited for this purpose. It is known per se that by properly dimensioned displacement between the worm and worm wheel a stoppage of a driven worm wheel can be obtained. When the return swinging movement of the lever 14 is completed, the operations can begin again.

Referring to the embodiment shown in Figs. 5 to 9, the feed band for the cigarettes Z consists of an endless chain the links 11 of which are formed with suitable channels 10 each intended to hold a cigarette. The separate cigarettes are thus disposed at equal distances apart with their axes parallel. The feed chain moves in the direction of the arrow shown in Fig. 5 transversely of the longitudinal direction of the cigarettes. The feeding movement may be intermittent or continuous. Above the feed band is provided a photo cell 9 combined with an illuminating device which consists of two electric lamps 1 which however preferably project parallel rays through a lens on that part of the cigarette passing beneath it on which the imprint is located. The reflected light strikes the photo cell 9 and through a strengthening relay 56 energizes an electromagnet 55 each time a cigarette passes beneath the photo cell with its imprint directed towards the photo cell. The energized electromagnet attracts a lever 57 which is rotatable about the pivot 58 a spring 59 tending to pull the lever continuously away from the electromagnet and against a stop 60. In other words the lever indicated at 61 on each passage of a cigarette on which the imprint is properly located makes a swinging movement. In this swinging movement the end of the lever 61 strikes the end 62 of a longitudinally movable pin 63. On a drum 64 is arranged a definite number of pins 63 which are axially movable and concentric with the drum spindle 65 the separate pins being equally spaced from one another.

Adjacent the drum 64 is provided a stationary guide face 66 (see Fig. 7) which the heads 67 of the pins 63 pass by. As a result all the pins are pushed into a forward position which is shown for example by the extreme right and left hand pins in Fig. 6.

The lever 61 however on its swinging movement strikes the pin at the moment in its path and displaces it axially. The same operation is effected on all of the pins which pass until a cigarette passes below the photo cell 9 which does not present its printed side to the photo cell. Thereupon the photo cell is more strongly excited. The stronger excitation of the photo cell is utilized to control the electromagnet in such manner that it is not energized. The lever 61 under the influence of its spring 59 is held against its stop 60 (c. f. the dotted position in Fig. 6). The corresponding pin 63 is thus not pushed forward.

Figure 5:
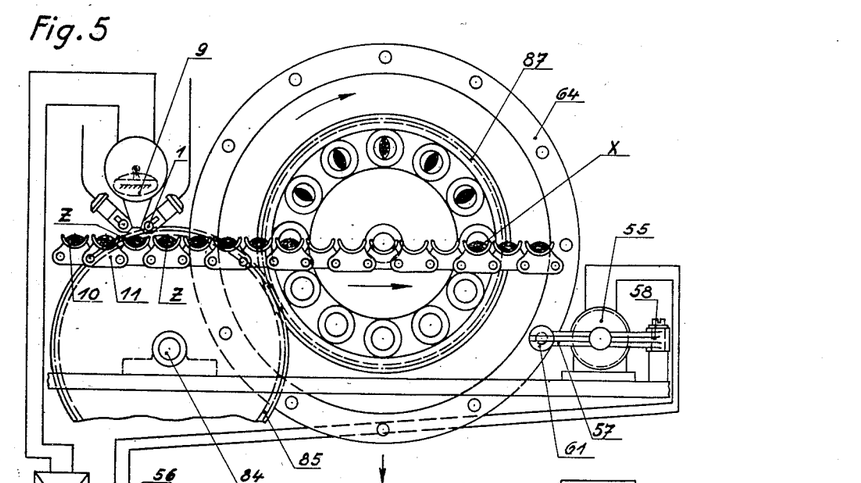

The drum 64 rotates in the direction of the arrow in Fig. 5. On rotation of the drum the pins not pushed forward finally move into the path of a lever 68 (see also Fig. 8) which is rotatable about the pivot 69 and has an extension 70. To this extension 70 is connected a spring 71 which tends to press the lever continuously into the inoperative position (shown in Fig. 8). Only those pins strike the extension 70 which are not pushed forward by the lever 61 controlled by the electromagnet. These pins cause the lever 68 to swing into the position shown in dotted lines in Fig. 8. The free end of the lever 68 is of wedge shape at 72. On the inward swing movement of the lever the one wedge surface contacts with the rounded end of the longitudinally movable gripping pin 73. On a drum 74 which is arranged on the spindle 65 of the drum 64 are arranged so as to be axially displaceable and concentric with the spindle 65 at equal distances apart a number of gripping pins 73. Their number corresponds to the number of the pins 63 and their position in relation to the projection 63 is congruent with respect to the angular distribution. The free end of the pins 73 is formed as a gripping means being provided with an oval recess 75 for the insertion of the cigarette end.

The lever 68 swinging into the operative position with its wedge shaped end 72 pushes the corresponding pin 73 axially into operative position. The drum 74 is located opposite a drum 76 of similar construction. The two drums are arranged co-axially and are provided with the same number of axially movable engaging pins 73. An arrangement is thus provided which ensures that on the axial displacement of a definite engaging pin the opposite pin of the drum 76 is also displaced. This arrangement consists of a rock lever 77 formed as a double armed lever (see Fig. 7) and rotatable about the pivot 78. The free end of this lever is controlled by the wedge shaped part 72 of the rock lever 68 on its inward swinging movement into working position, so as to cause the lever 77 to swing outwards. To the lever is pivoted a connecting rod 79 which engages a rock lever 80 disposed in the path of the drum 76 which swings about the pivot 81 and the free end 82 of which acts on the rounded end of the corresponding engaging pin 73 of the drum 76 so that this pin is pushed forward in the same direction as the corresponding pin of the drum 74.

Between the two drums 74 and 76 the sides of which face one another is arranged the feed track consisting of the chain 10, 11, which carries the cigarettes Z.

The photo cell 9 is located at a definite distance in front of the point where the engaging pins controlled by the levers 68 and 80 become operative. The lever 61 or the electromagnet 55 is arranged to correspond to this distance. The cigarette Z directly below the photo cell in the embodiment illustrated must move through the distance of five cigarettes before it moves into the path of the pins 73, 75, and the pin 63 not controlled by the lever 61 must move a distance of five pins further before it can pass into engagement with the lever 68.

Figure 6:
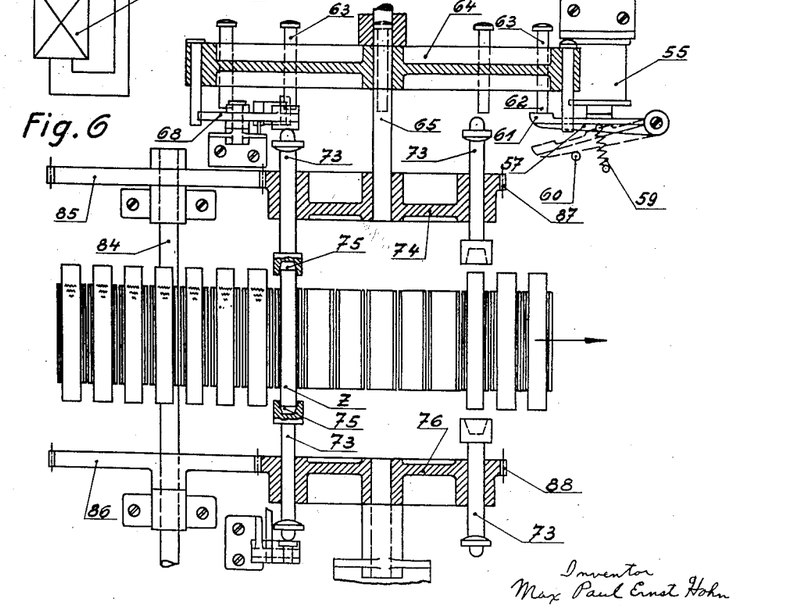
Fig. 6 a plan view in part horizontal section.
Figure 7:
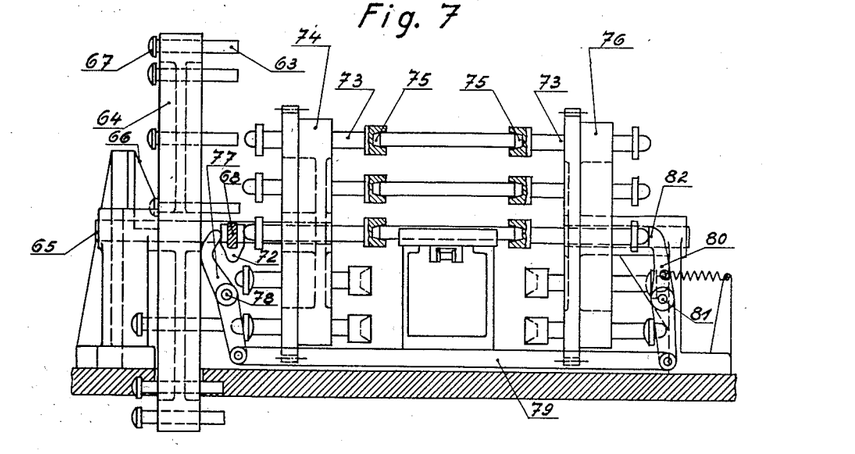
Fig. 7 is an end view looked at in the direction of the arrows shown in Fig. 6.
Figure 8:
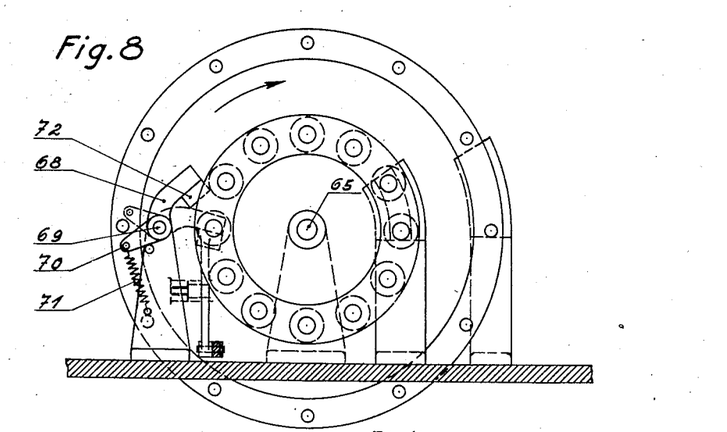
Fig. 8 is a side elevation looked at in another direction shown in Fig. 6.
Figure 9:
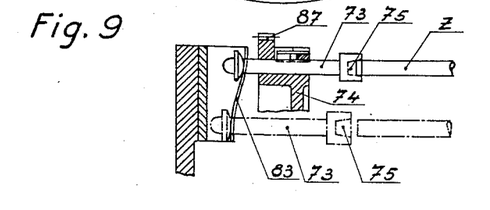
Fig. 9 is a detail.
Figure 10:
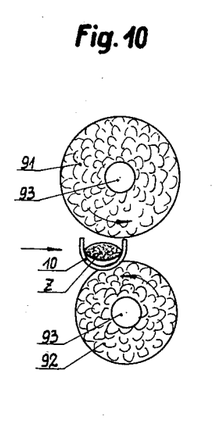
Figs. 10–15 inclusive illustrate a further embodiment wherein the cigarettes are rotated by very resilient means. The said figures illustrating stages of the operation.
Figure 11:
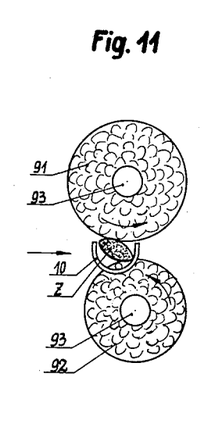
Figure 12:
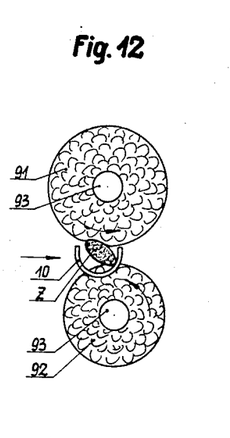

As soon as a pin 63 acting as a projection extends into the path of the lever 68 and this pin strikes the lever the corresponding engaging pin 73 is displaced as shown in Fig. 6 of the drawings. The oval or conical recesses 75 receive the cigarette ends. The corresponding cigarette Z is thus gripped by the pins. As the pins are carried by the drums 74 and 76 the corresponding cigarettes are raised from the feed track 10, 11, and only after rotation through 180° to the point indicated by X in Fig. 5 are again deposited in the empty seat 10 of the feed track. Accordingly this cigarette which lay on its imprint has now been rotated through 180° into the correct position in relation to the other cigarettes on the track.

On the rotation of the drums 74 and 76 the pins 73 are pushed back by the guide surface 83 (shown at Fig. 9) at the moment when it is desired to deposit the cigarette held by it.

The drums are driven from the driving shaft 84 through the pinions 85, 86, which mesh in corresponding toothed rims 87 and 88 on the drums 74 and 76.

It is clear that on rotation of the cigarettes about their longitudinal axes two problems must be solved. In the first place whether the cigarettes are round, oval or of other cross section rotation must take place exactly through a definite amount and the mechanical means which grip the cigarettes in order to effect rotation must not damage the paper cases thereof.

These problems are solved in accordance with the present invention in a further embodiment by the cigarettes being rotated by very resilient means engaging their periphery either such means or the cigarettes or both having imparted thereto a forward feed movement.

The cigarettes are thus preferably rotated between two frictionally acting entraining means diametrally opposite one another on the periphery of the cigarettes but of extraordinarily resilient material such as for example rubber sponge.

Whether the cigarettes are offered to the entraining members while stationary or are disposed on a continuously moving track the entraining members must be arranged to be rotated and controlled and moved.

Figure 16:
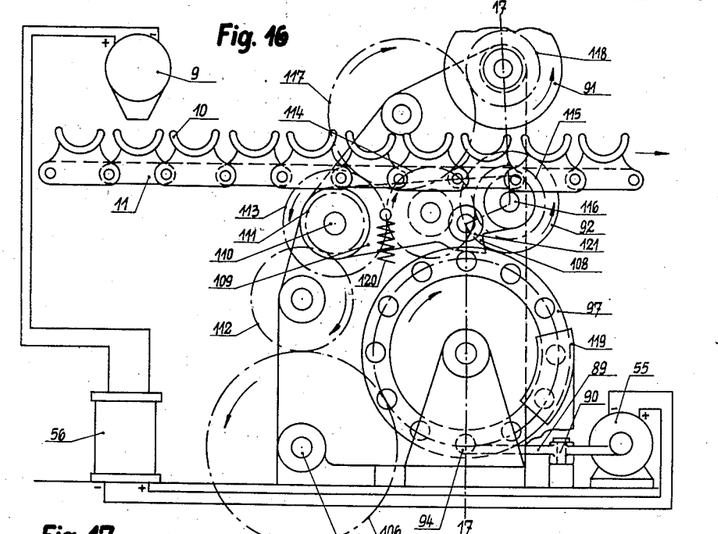
Fig. 16 shows in side elevation and Fig. 17 in vertical cross section on line 17—17 of Fig. 16, the device for rotating the cigarettes as shown in Figs. 10–15 and in which the rotating means are controlled by a photo-cell.
Figure 17:
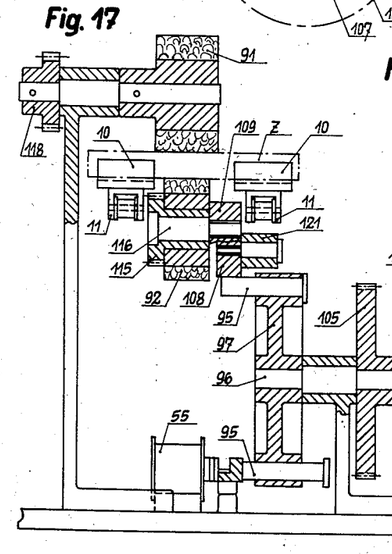
Figure 18:
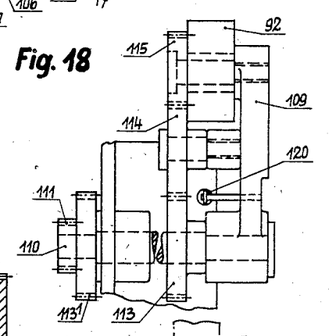
Figs. 18 and 19 show details.
Figure 19:
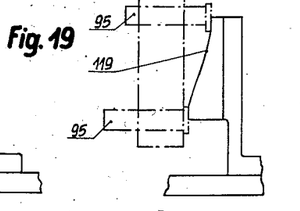

For further explanation of this embodiment reference is now had to Figs. 10 to 15 of the drawings whilst in Fig. 16 is shown in side elevation and in Fig. 17 in vertical cross section on the line 17—17' of Fig. 16 a device for rotating the cigarettes in which the rotating means are controlled by a photo cell. Figs. 18 and 19 show details.

Figure 13:
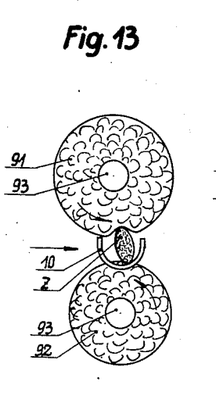
Figure 14:
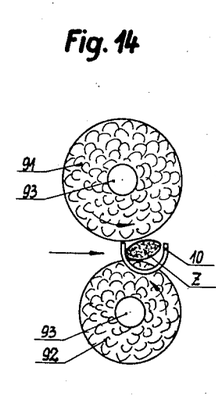
Figure 15:
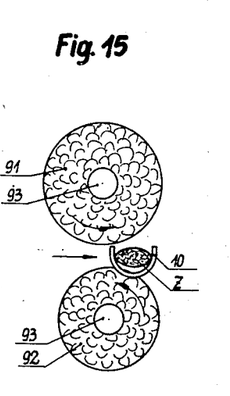

In the embodiment shown in Figs. 10 to 15 it is assumed that the roller-like entraining members 91 and 92 are provided which consist of a core 93 with a covering of rubber sponge material. It is also assumed that the separate cigarettes of oval cross section are disposed in the seats 10 and arranged with their axes parallel to the rollers 91 and 92, the seats being moved forward in the direction of the arrow continuously with uniform speed. The seats are provided in the middle with a gap in which the cigarettes are free so that the rollers 91 and 92 can engage therewith. If rotation of a cigarette in a seat 10 is to be effected the lower roller 92 which is movably mounted is raised so as to come in contact with the cigarette Z. This roller rotates in the direction of the arrow causes the cigarette in the forward movement of the seat to be raised and thereby brought into contact with the entraining member 91 which is rotating continuously in the opposite direction. This roller moves at a higher peripheral speed than the speed of movement of the seats 10. The excess peripheral speed of the roller corresponds to the peripheral speed of the lower roller 92. Accordingly, the cigarette between the two rollers is gripped softly and uniformly, is completely raised as shown in Fig. 13, the great resilience of the roller covering assisting in the matter. Finally the cigarette is completely turned around so that after the two rollers 91 and 92 pass it has been rotated through 180°.

The movably mounted lower roller 92 is controlled as shown in Figs. 16–19 and as hereinafter explained.

The seats 10 are carried by the links 11 by an endless chain moved in the direction of the arrow. On this chain the seats are located at regular intervals apart. The chain is fed past the photo cell 9. The point on which the imprint is provided on the cigarette is illuminated by a source of light (not shown). The reflected light falls on the photo cell and thereby energizes an electric circuit which is strengthened by the relay 56 and actuates an electromagnet 55. This electromagnet attracts a control lever formed as a double armed lever 89 and rotatable about the pivot 90, the free end 94 of which lever on its swinging movement striking against a longitudinally movable pin 95.

On a drum 97 arranged on the spindle 96 which is driven by the pinion 105 by means of the pinion 106 from the driving shaft 107 there is provided a number of pins 95 axially displaceable and arranged concentric with the spindle 96 at equal distances apart and near the periphery of the drum.

Each time the photo cell 9 operates the lever 94 swings upward and a pin 95 is pushed forward into the position shown at the lower side of Fig. 17. When however a cigarette is lying incorrectly a variation in the reflection of the rays of light occurs and therewith a difference in the electrical current produced by the photo cell. This difference acts on the electromagnet in such manner that the lever 89 remains at rest so that the pin 95 is not pushed forwards but retains the position of the upper pin shown in Fig. 17. The projecting end of the pin 95 in this position acting as a projection strikes against a lug 108 of a rock lever 109 which is rotatable about the pivot 110. On this pivot is mounted also a pinion 111 which is driven by the driving shaft 107 by means of the toothed gearing 106, 112. The roller 92 which is rotatably mounted on the spindle 116 and which is coated with a thick layer of rubber sponge is driven by means of the pinion 111 and by the toothed gearing 113, 113', 114, 115.

It is clear that by the pin 95 in question the lever 109 is raised and thereby the entraining roller 92 brought into operative position so that in cooperation with the roller 91 it can effect rotation through 180° of the cigarette resting in the seat. This roller 91 is driven by the driving shaft 107 through the toothed gearing 106, 111, 112, 113, 117, 118, so that it rotates continuously in the direction of the arrow i. e. opposite to the direction of the roller 92, but in the same direction as that of feeding movement of the chain 11.

Obviously the distance of the photo cell from the operative position of the entraining member is adapted to the distance apart and the number of pins so that actually the correct pin at the proper moment causes the lever 109 with the roller 92 to swing. In other words the drum 97 must always be displaced before a pin comes into the path of the lug 108 by an amount which corresponds to the length of the path which the chain must traverse from the photo cell testing point to the rollers 91, 92.

It should be noted that the pins 95 are returned by a stationary guide surface 109 when they have been displaced, back into working position shortly before they move into the path of the lever 89.

In Fig. 17 the lever 109 is shown again from above. The spring 120 pulls the lever downwards in such manner that a roller 121 on the lever runs along the periphery of the drum 97.

I claim:—

1. Means for dressing cigarettes and like goods provided with imprints comprising in combination with feeding means and cigarettes disposed parallel to one another on said feeding means, an illuminating means for illuminating the imprints of the cigarettes, a medium highly sensitive to light and heat disposed above said feeding means and adapted to receive light reflected from said imprints, said illuminating means comprising high candle-power projectors, said projectors mounted in a casing, said casing having conical tapering portions directed towards the imprints of the cigarettes and said light sensitive medium being arranged adjacent the projector casing and itself mounted in a casing said last mentioned casing tapering conically with its conical portion directed towards the cigarettes, an electric circuit controlled by the effect of said reflected light on said sensitive medium and means for rotating cigarettes, said means controlled by said electric circuit.

2. Means for dressing cigarettes and like goods provided with imprints comprising in combination with feeding means and cigarettes disposed parallel to one another on said feeding means, an illuminating means for illuminating the imprints of the cigarettes, a light or heat sensitive medium disposed above said feeding means and adapted to receive reflected light from said imprints, said illuminating means comprising high candle-power projectors, said projectors mounted in casings, said casings having conical tapering portions directed towards the imprints of the cigarettes and said light sensitive medium being arranged between the projector casings and itself mounted in a casing said last mentioned casing tapering conically with its conical portion directed towards the cigarettes, an electric circuit adapted to be affected by the influence of said reflected light on said sensitive medium, and means for rotating cigarettes, said means controlled by said electric circuit.

3. Means for dressing cigarettes and like goods provided with imprints comprising in combination with feeding means and cigarettes disposed parallel to one another on said feeding means, an illuminating means for illuminating the imprints of the cigarettes, a medium highly sensitive to light and heat disposed above said feeding means and adapted to receive reflected light from said imprints, an electric circuit adapted to be controlled by the action of said reflected light on said sensitive medium and means for rotating cigarettes controlled by said electric circuit, said means comprising grippers, said grippers adapted to be reciprocated in the direction of feed of the feeding means and on movement in the one direction to rotate through 180°, means tending to hold open the grippers, said means under the control of the electric circuit and said means also effecting closing of the grippers during their movement in the direction of feed of the cigarettes.

4. Means for dressing cigarettes and like goods provided with imprints comprising in combination with feeding means and cigarettes disposed parallel to one another on said feeding means, an illuminating means for illuminating the imprints of the cigarettes, a medium highly sensitive to light and heat disposed above said feeding means and adapted to receive reflected light from said imprints, an electric circuit adapted to be controlled by the action of said reflected light on said sensitive medium and means for rotating cigarettes controlled by said electric circuit, said means comprising grippers, a rotatable member carrying said grippers, a bearing member supporting said rotatable member, said bearing member reciprocated in the direction of feed of the cigarettes, a worm wheel carried by said bearing member, a stationary worm meshing with said worm wheel, the diameter of the worm wheel and the speed of rotation of the worm being so dimensioned in relation to one another that on movement of the bearing member in the direction of feed of the cigarettes the rotatable member is turned through 180° while the worm wheel is displaced without rotation on its worm on the movement of the bearing member in a direction opposite to that of feed of the cigarettes.

5. In a device for dressing oval cigarettes or the like having imprints, a feed track on which the cigarettes are disposed parallel to one another with their longitudinal axes transversely of the direction of feed, a medium highly sensitive to light and heat disposed above said feed track, illuminating means arranged adjacent said highly sensitive means, a turning device adapted to reposition cigarettes that are reversed with regard to their imprints, and at least one condensing lens for trapping the rays divergently reflected from the curved cigarette surface converting them into parallel rays and directing them onto the sensitive medium.

6. In a device for dressing oval cigarettes or the like, as per claim 5, in which the illuminating means and said sensitive medium are each mounted in a conically tapered casing the tapered portion of which is directed toward the cigarettes.

7. In a device for dressing oval cigarettes or the like, as per claim 5, in which the turning device comprises a rotatable member carrying grippers and which is reciprocated in the direction of feed and only on movement in the forward direction rotates through 180°, means tending to hold said grippers continuously in the open position and means controlling said last named means so as to close said grippers during the forward movement of the latter.

8. In a device for dressing cigarettes or the like as per claim 5, in which the rotatable member is carried by a bearing arranged on the end of a rock lever, spring actuated operating means for said grippers tending to normally hold said grippers closed and means associated with the said rock lever for moving said operating means so as to cause said grippers to open.

9. In a device for dressing cigarettes, a rotatable member carrying cigarette grippers, a bearing for said member arranged on the end of a rock lever, spring actuated gripper actuating means tending to normally hold said grippers closed, said rock lever having a hollow pivot, a spring actuated connecting rod operatively connected to said gripper actuating means, a member movably borne in said hollow pivot and at one end operatively connected to said connecting rod, and cam controlled means for permitting said member to operate said connecting rod to cause said grippers to open.

10. In a device as per claim 9, in which an electro-magnetically controlled locking means is provided for locking said cam controlled member against movement as long as the cigarettes are in the dressing position.

11. In a device as per claim 5, in which the axis of the turning member is eccentric to the longitudinal axis of the cigarettes whereby the cigarette gripped by the grippers will first be raised from the feed track before it is turned.

12. In a device for dressing cigarettes, a feed track comprising an endless chain the links of which are formed with channels each to hold a cigarette, said feed chain being adapted to move transversely to the longitudinal direction of the cigarettes, a photo-cell and an illuminating device having a lens and combined with said cell, said illuminating device being adapted to project its rays through said cell on that part of the cigarette passing beneath it on which the imprint is located, an electromagnet adapted to be energized by the reflected light and rotary means having movable gripping members, said gripping members being controlled by said electromagnet to grip a cigarette located out of dressing position and turn said cigarette into the dressing position.

13. In a device as per claim 12, in which said rotary means comprises a drum having a plurality of movable concentrically and equidistantly arranged members, a cam body adapted to push said members into operative position, means controlled from said electro-magnet to displace said members into indifferent positions, and means comprising movable grippers adapted to be actuated by said members to grip the cigarette improperly located and turn the same into the dressing position.

14. In a device as per claim 12, in which the movable feed track passes between two revolving drums, each carrying a plurality of axially displaceable gripping members, the peripheral speed of said drums corresponding with the speed of said track, the cell controlled means being arranged at a distance from the operative grippers and the electromagnetically controlled means for said grippers being arranged to correspond to said distance.

15. In a device for dressing cigarettes, resilient means adapted to frictionally engage the periphery of the cigarettes and rotate the same into dressing position.

16. In a device as per claim 15, in which the cigarettes are rotated between two oppositely moved resilient entraining members frictionally engaging the periphery of the cigarettes.

17. In a device as per claim 15, in which the separate cigarettes are rotated by entraining members moved with the speed of feed but in opposite directions.

18. In a device for dressing cigarettes as per claim 15, in which the cigarettes are carried by a feeding means moving continuously and at uniform speed, and resilient entraining means are provided, so arranged that one entraining member is moved in a direction opposite to that of the feed of the cigarettes and the other in the direction of movement of the feeding means for the cigarettes but with a speed exceeding the speed of feed by an amount corresponding to the speed of the first entraining member.

In testimony whereof I affix my signature.
MAX PAUL ERNST HOHN.